United States Patent Office 2,999,875
Patented Sept. 12, 1961

2,999,875
PREPARATION OF AMINO ACIDS
Arthur F. Ferris, Princeton, N.J., and Harold K. Latourette, Clarence, N.Y., assignors to Food Machinery and Chemical Corporation, New York, N.Y., a corporation of Delaware
No Drawing. Filed Nov. 21, 1957, Ser. No. 697,786
15 Claims. (Cl. 260—465.4)

This invention relates to the production of certain α-amino carboxylic acids and related compounds. In particular, this invention provides a novel process whereby alpha,omega-diamino acids and related compounds are prepared in a simple reaction sequence from low cost and readily available starting materials.

As is well known, the α-amino carboxylic acids are the fundamental building blocks of animal and vegetable proteins. Because of this nutritional importance and commercial value, a great deal of effort has been devoted to attempts to make these acids synthetically. The processes heretofore available for the synthesis of certain of the α-amino acids useful as dietary supplements, such as lysine and arginine, have been characterized by a high degree of complexity, and accompanying high cost. For example, the classical synthesis of lysine from cyclohexanone requires seven steps, involving converting the cyclohexanone to the oxime, rearranging the oxime to epsiloncaprolactam, opening the lactam ring and benzoylating to give 6-benzamidocaproic acid, brominating to the α-bromo acid bromide, hydrolyzing to the α-bromo acid, ammoniating to the α-amino acid, and hydrolyzing to DL-lysine.

The most important synthetic procedure in present commercial use is likewise a complicated, multi-step process, wherein the starting material furfural is first reduced to tetrahydrofurfuryl alcohol, then dehydrated and rearranged to 2,3-dihydropyran, which is cleaved to 5-hydroxyvaleraldehyde, which is then converted to 5-(4-hydroxybutyl)hydantoin. The hydantoin is converted to the 5-(4-chlorobutyl) derivative, then the sodium salt of this derivative is prepared, and condensed with itself to give a polymer which is hydrolyzed by base to the sodium salt of lysine, from which lysine hydrochloride is finally prepared. The large number of chemical and operational steps thus again result in poor overall yield and high cost. Of the other methods presently in commercial use for the preparation of lysine, one is based on the hydrolysis of waste products of the meat packing industry, notably dried blood; the process is complicated, and has the additional disadvantage that it is limited by the amount of waste available and hence is not adapted to large volume production. Another lysine process in commercial use relies on fermentation by two different microorganisms, in succession, to produce lysine. The process is both complex and quite time-consuming, requiring a number of carefully controlled steps. None of the current or classical lysine processes approaches in simplicity, economy, or utility that of the instant invention.

With respect to the essential amino acid arginine, which is also available by means of our novel process, there is again no comparable synthetic method. Arginine is not at present prepared in large commercial quantities. On a laboratory scale, it has been obtained from natural sources in a manner essentially similar to that described for lysine. It has been obtained synthetically by the reaction of cyanamide with ornithine, hence any synthesis of ornithine also can be a synthesis of arginine by adding one more step. Ornithine, the analog of lysine with one less carbon atom, has classically been synthesized from cyclopentanone by a seven step process exactly analogous to the previously described synthesis of lysine from cyclohexanone. It has also been prepared from malonic ester, the process involving oximination of the malonic ester, and hydrogenation of the oximino ester in the presence of acetic anhydride to acetamidomalonic ester, followed by condensation with acrylonitrile, reduction to a substituted piperidone, and hydrolysis to ornithine. It may be noted that lysine has been prepared also from acetamidomalonic ester by condensation with several reagents followed by other conversions, but none of these methods has attained commercial importance.

In contrast to the methods described above, the invention described and claimed herein provides a simple method for the preparation for certain α-amino acids, some essential to nutrition such as lysine and arginine, and some useful in other ways, and constitutes a major improvement in the synthesis of these amino acids.

Accordingly, an object of the instant invention is to provide a simple, economical process for the preparation of certain α-amino acids. A further object is to provide a novel sequence of reaction steps for this synthesis. Another object is to provide a simple method for the production of compounds related to these acids. Additional objects and advantages inherent in this invention will become apparent from the following description.

The present invention involves the conversion of cyclic ketones, specifically cyclic α-oximino ketones, by a novel cleavage reaction, to compounds which are readily converted to alpha,omega-diamino acids. The preferred reaction sequence is depicted by the following equations:

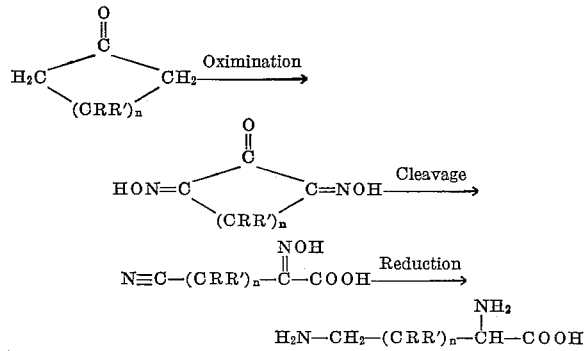

In the above formulae, $n$ may be an integer from two to four; that is, the starting material may be a five, six or seven membered ring. R and R' may each be hydrogen or any desired substituent.

For the alpha,omega-diamino acid lysine, important as a nutritional supplement, the starting material is cyclohexanone. If cyclopentanone is the starting material, one possible product is ornithine, which may be used as mentioned previously to prepare arginine, another important nutritional supplement. If a hydrolysis step is inserted between the cleavage and reduction steps, cyclopentanone can be made to yield glutamine, a chemotherapeutic agent which has shown promise against alcoholism and ulcers, or glutamic acid, widely used, in the form of its monosodium salt, as a flavoring agent.

If R or R' is a substituent other than hydrogen, for example an alkyl, aryl, halogen, hydroxy, alkoxy, acyloxy, sulfhydryl, mercapto, dialkyl- or diarylamino, acylamino, carboxy or carbalkoxy group, then substituted lysines, ornithines, arginines, glutamines, glutamic acids, and the like, can be synthesized. Such compounds are of considerable interest as chemotherapeutic agents, since they frequently act as amino acid antagonists in living things.

Other modifications in the reaction permit the production of a variety of substituted carboxylic acids and derivatives thereof. For example, if one of the alpha positions of the cyclic ketone is initially substituted with a potential amino group the reaction sequence may still be carried out, with ultimate conversion of the potential amino group to an amino group. Such potential amino groups include oximino, amido or nitro groups, for example; or halogen, which on reaction with ammonia or ammonia-type compounds yields an amino group; or an amino group itself, or its derivatives, may occupy the alpha-position initially. If this alpha-substituent is something other than a potential amino group, it is seen that the reaction steps may still be conducted, via formation of the monoxime from the cyclic ketone followed by rearrangement, but the final product would not be an alpha,omega-diamino acid, but rather another alpha-substituted omega-amino acid.

The first step of the process of this invention utilizes a cyclic structure, as illustrated. These are limited to the 5-, 6- and 7-membered ring structures of cyclopentanone, cyclohexanone and cycloheptanone. In these structures the two positions alpha to the keto group should be either unsubstituted or substituted with groups which are readily displaced, such as carbalkoxy. The rest of the ring may be substituted with such groups as alkyl, halogen, or other substituents which do not interfere with the desired reaction sequence, either by themselves reacting with nitrite esters or nitrous acid, or by activating the compounds so that nitrosation occurs at other locations than at the alpha-carbon atoms.

The cyclic ketone may be oximinated by known methods. These are discussed in detail in an article entitled "The Nitrosation of Aliphatic Carbon Atoms" by O. Touster, in Organic Reactions, volume VII, John Wiley & Sons, Inc., New York (1948), pp. 327–377. This article describes the various methods of nitrosation, and presents experimental conditions. On pages 350–351 of the article the general types of nitrosating methods and reagents are classified as follows: inorganic nitrite and acid; alkyl nitrite and an alkoxide; alkyl nitrite and hydrogen chloride; nitrosation in concentrated sulfuric acid; nitrosyl chloride; nitrous fumes. The reagent selected depends on such factors as effectiveness, cost, and the stability in it of the starting material and product. The most widely used reagent combination is that of an alkyl nitrite and hydrogen chloride; and this combination is effectively and conveniently used in the nitrosation of cyclic ketones to form $\alpha,\alpha'$-dioximino ketones. The reaction is conducted in the presence of a solvent, such as ethyl acetate, alcohols or ethers. Solvents which would themselves react with the nitrosating agent, such as acetone or nitroparaffins, should of course be avoided.

Since cyclic ketones react vigorously and exothermically with alkyl nitrites and hydrochloric acid, a low temperature should be maintained during the oximination reaction. The oximination of cyclohexanone, for example, may be carried out over a temperature range of about $-30$ to $+50°$ C. At very low temperatures the reaction proceeds too slowly for convenience, and at temperatures over about $50°$ C. only tarry side products are obtained. A preferred temperature range is about $0-30°$ C., maintained by external cooling. An inert atmosphere, although desirable, is not necessary. Neutralizing the acid catalyst after completion of the reaction is also advisable, although not necessary. Other cyclic ketones may be oximinated under similar conditions. The $\alpha,\alpha'$-dioximino cyclic ketones are the preferred reactants in the preparation of alpha,omega-diamino acids, and are readily prepared by the general process described above.

As previously stated, the cleavage reaction of this invention will occur even if only one of the $\alpha$-positions of the cyclic ketone is oximinated. The other $\alpha$-position may contain a different potential amino group, or any other group which may be desired in the position alpha to a carboxy group. However, this novel synthesis of $\alpha$-amino acids is a result of the discovery that a potential amino group in the $\alpha$-position of an $\alpha'$-oximino cyclic ketone is, on cleavage, found in the $\alpha$-position of a linear omega-cyano carboxylic acid. This is illustrated with cyclohexanone as follows, where X is any potential amino group:

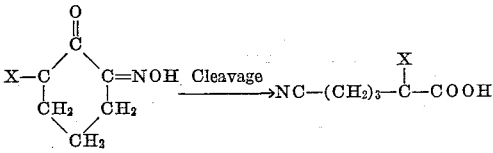

It is thus seen that any group in the 6-position of 2-oximino-cyclohexanone turns up in the 2-position of 5-cyanovaleric acid. Based on this discovery, the synthesis of not only many known compounds which were not heretofore readily available, but many new compounds of substantial potential utility, may now be readily accomplished. In the preferred process for alpha,omega-diamino carboxylic acids, X in the above equation is an oxime group, since the $\alpha,\alpha'$-dioximino ketones are readily prepared from the corresponding cyclic ketones, and both the oxime and cyano groups in the resulting cleaved product may simultaneously be reduced in the final step of the process.

This cleavage reaction is accomplished by reacting the oximino ketone with an acylating agent in the presence of a base. A wide variety of acylating agents may be used. In general, any acylating agent which, when added to a solution of the oxime in aqueous alkali, will react with the oxime salt in the presence of water, may be used; that is, any acylating agent which will acylate in the presence of aqueous base. These include aliphatic and aromatic acid chlorides, carboxylic acid anhydrides, aromatic and aliphatic sulfonyl chlorides, ketones, alkyl chloroformates, inorganic acylating agents including phosphorus oxychloride, phosgene, thionyl chloride and phosphorus pentachloride, and many other inorganic and organic acylating agents. As would be expected, those acylating agents which are relatively stable to hydrolysis give the best results. If a very reactive acylating agent is used, such as acetyl chloride or benzene sulfonyl chloride, it may be necessary to increase the amount of acylating agent in order to get the desired ratio of reactants, due to hydrolysis of the acylating agent during the reaction.

As the basic reactant, the base used preferably is strong enough to dissolve the $\alpha,\alpha'$-dioximino ketone, although a partially soluble or heterogeneous system may also be used. Sodium or potassium hydroxide or carbonate are suitable, commonly used reagents. Preferably enough base should be present at the beginning of the reaction to neutralize all of the acid products formed during the reaction.

The cleavage reaction is normally run by dissolving the dioximino-ketone in aqueous base and adding the acylating agent. It is essential to the production of omega-cyano carboxylic acids that the reaction be conducted so only a single cleavage takes place. By using an excess of acylating agent the reaction can be directed toward producing the dinitrile by cleavage of both oxime groups, but since in the preparation of alpha-omega-diamino acids it is desired to avoid cleavage of both oxime groups, it is preferable to use no more than an equimolar amount of acylating agent per mole of dioxime. Some of the desired alpha-oximino-omega-cyano acid is formed using as much as about 1.5 mole of acylating agent per mole of dioxime, but an excess above an equimolar ratio should be avoided unless reaction of both oxime groups is actually desired. It has been found that best yields are obtained when the reactants are present in a ratio of about 0.5–0.75 mole of acylating agent per mole of dioxime. If the process is run as a continuous one it may be advantageous to use a much lower ratio of acylating agent to dioxime, recycling unreacted dioxime, thereby eliminating all dinitrile formation due to cleavage of both oxime groups. Of course if some of the acylating agent is destroyed by water, added quantities must be used to reach the desired ratio of acylating agent to dioxime. It is apparent that, if there is only one oxime group present at the start, with some other potential amino group occupying the other alpha position in the cyclic ketone, then at least an equimolar amount of acylating agent would be preferred to accomplish the cleavage between the carbonyl and the carboximino group.

The reaction temperature of the cleavage step is controlled by the joint considerations of obtaining a relatively rapid reaction rate by raising the temperature, yet keeping the temperature low enough to avoid hydrolysis of the nitrile group formed in the reaction. The reaction tends to be rapid, and the rate depends on how efficiently the exothermic reaction can be controlled. A usable temperature range is about 0–50° C. At the lower limit the reaction is slow, and at over about 50° C. the nitrile is hydrolyzed in the strongly basic aqueous medium. From practical considerations, about 10–30° C. is a preferred range. To avoid exceeding the upper temperature limit the acylating agent should be added slowly, with vigorous stirring and cooling.

The product of the cleavage step is in the form of a salt. After all the acylating agent has been added the solution may be acidified, precipitating unreacted dioximino ketone. For reasons of economy, it is preferred to use a strong mineral acid such as sulfuric, hydrochloric, phosphoric, nitric or the like.

The alpha-oximino-omega-cyano carboxylic acid should then be separated from the reaction mixture. This may be done in a variety of ways. For example, the oximino acid may be extracted using an appropriate solvent, such as isopropanol, ethyl acetate, methyl isobutyl ketone, mixed solvent systems, etc. Or the oximino acid may be precipitated by forming a complex with a metal ion such as nickel, cupric, cobalt or other metal ions which form an insoluble complex with the oximino acid. The precipitated metal complex is then separated, and either used directly in the reduction step, or the free alpha-oximino-omega-cyano acid may be recovered.

A number of these oximino acids are new compositions of matter, and further may be used in the synthesis of compounds other than alpha, omega-diamino acids. For example, the 4-cyano-2-oximinobutyric acid obtained by cleavage of 2,5-dioxiaminocyclopentanone may not only be reduced to ornithine, but also be selectively reduced to 4-cyano-2-aminobutyric acid, followed by hydorylsis of the nitrile to form glutamine. Alternatively, the 4-cyano-2-oximinobutyric acid may be first hydrolyzed to 4-carbamido-2-oximinobutyric acid and the latter may then be reduced to glutamine. With either route, if the hydrolysis is carried to the carboxylic acid stage instead of being stopped at the amide stage, glutamic acid is produced. Similarly, the 5-cyano-2-oximinovaleric acid obtained by cleavage of 2,6-dioximinocyclohexanone may be partially hydrolyzed and reduced (or first selectively reduced and then partially hydrolyzed) to homoglutamine, or may if the hydrolysis is carried to completion give homoglutamic acid (α-aminoadipic acid). As mentioned previously, prithine may be reacted further with cyanamide to produce arginine. Similarly, lysine may be reacted with cyanamide to form homoarginine (2-amino-6-guanidocaproic acid). In like manner, the substituted omega-cyano-alpha-oximino acids obtained from substituted cyclopentanones and cyclohexanones may be used to prepare substituted glutamines and homoglutamines, glutamic acids and homoglutamic acids, and arginines and homoarginines. Such compounds are difficultly available, if at all, by previously known methods.

The final step in the synthesis of alpha-omega-diamino acids is the reduction of the omega-cyano-alpha-oximino acid formed in the cleavage step to the corresponding diamino acid. Catalytic hydrogenation may be used, and a variety of catalyst-solvent systems are effective. Precious metal catalysts which are suitable include unsupported platinum black or palladium black, platinum oxide (Adams' catalyst) and various forms of supported platinum and palladium, for example on charcoal or alundum. Aliphatic carboxylic acids, such as acetic, propionic, and butyric acids alone or in admixture with other solvents such as ethers, esters, alcohols and the like are suitable solvents for use with the precious metal catalysts. Active forms of metals of group VIII of the periodic table, such as "Raney nickel" and "Raney cobalt," are also useful. Solvents such as aliphatic alcohols are generally used, although other solvents such as acetic anhydride may be employed. Chemical reduction of the omega-cyano-alpha-oximino acids may also be used. The combination of sodium potassium and an aliphatic alcohol is effective. Electrolytic reduction may also be used. Since in the preferred process of this invention both a nitrile and an oximino group are reduced simultaneously, those catalysts and organic or inorganic reducing agents which are used must be capable of affecting both these groups.

The reduction is sometimes conducted in improved yield by first converting the omega-cyano-alpha-oximino acid to an ester, and reducing the ester. Due to the sensitivity of the oximino acid to heat, and the sensitivity of the nitrile group to alcoholysis, conventional esterification procedures can not conveniently be carried out, and very mild procedures are required. For example, esterification may be accomplished by a process which consists essentially in dissolving the acid in a large excess of absolute alcohol, adding a little acid chloride and allowing the mixture to stand for several days. The ester may then be separated by distilling off the alcohol at reduced pressure and recrystallizing the residue. Any simple alcohol and a number of acid chlorides are suitable in this reaction. For example, thionyl chloride, acetyl chloride, stearoyl chloride, ethyl chloroformate or other acid chlorides, and compounds such as phosphorus oxychloride or phosphorus trichloride, can be used.

Catalytic hydrogenation of the esters of omega-cyano-alpha-oximino acids may be carried out with precious metal catalysts, such as platinum oxide (Adams' catalyst), platinum black, palladium black, palladium on charcoal, or platinum on alundum. Acid anhydrides, such as acetic anhydride, propionic anhydride or butyric anhydride may be used as solvents, as well as carboxylic acids such as acetic, propionic, butyric and the like. Catalytic hydrogenation of the ethyl ester of 5-cyano-2-oximinovaleric acid to form the ethyl ester of lysine, employing a platinum oxide (Adams') catalyst in acetic anhydride, has been described in the literature by Olynyk et al., J. Org. Chem. 13, 465 (1948). Elements of group VIII of the periodic table in specially activated form, such as "Raney nickel" and "Raney cobalt" are also effective catalysts for the reduction of the esters, generally in alcoholic solvents, although other solvents such as acetic anhydride may be used. Chemical or electrolytic reduction of the esters may also be carried out.

The invention is illustrated further by the following specific examples, which are presented for purposes of illustration only and are not intended to be limitative in terms of the particular reactants or conditions described therein.

*Example 1.—Preparation of 2,6-dioxiiminocyclohexanone*

To a solution of 171.5 g. of cyclohexanone in 1000 ml. of ether was added 20 ml. of concentrated hydrochloric acid. The solution was cooled to 0° C. and nitrogen was passed slowly through it for 10–15 minutes. Then, with nitrogen flow continuing, methyl nitrite was passed in slowly from an external generator. The methyl nitrite was generated by adding a solution of 139 ml. of concentrated sulfuric acid in 250 ml. of water slowly to a mixture of 290 g. of 95% sodium nitrite, 144 g. of methanol, and 170 ml. of water. The temperature was maintained at −4 to +2° C. by external cooling while the methyl nitrite was passed in. A yellow solid precipitated as the reaction proceeded. The reaction mixture was allowed to warm to 25° and to stand for 3 hours. The solid product was recovered by suction filtration, washed with three 100 ml. portions of ether, and dried in a vacuum desiccator. There was obtained 170.4 g. (56%) of crude 2,6-dioximinocyclohexanone, pure enough for use in the next step of the reaction. For an analytical sample, a portion of the material was recrystallized four times from 2:1 methanol-water, the first solution containing a little pyridine. The final product was a mass of fine yellow needles which did not melt but charred in the range of 160–200° when heated in a capillary.

*Analysis.*—Calcd. for $C_6H_8O_3N_2$: C, 46.15; H 5.16; N, 17.95. Found: C, 46.22; H, 5.17; N, 17.77.

*Example 2.—Preparation of 5-cyano-2-oximinovaleric acid*

To a solution of 388 g. of sodium hydroxide in 3500 ml. of distilled water was added slowly and with stirring 303 g. of 2,6-dioximinocyclohexanone. The temperature was held at 20–25° C. by external cooling as the 2,6-dioximinocyclohexanone dissolved. Then with vigorous stirring 147.8 g. of acetic anhydride was added dropwise over 36 minutes, the temperature being held at 20–25°. The reaction mixture was stirred for one half hour, then acidified with 500 ml. of a solution of sulfuric acid prepared by diluting concentrated sulfuric acid with an equal volume of water, maintaining the temperature at 20–25° C. As the acidification progressed, unreacted 2,6-dioximinocyclohexanone, amounting to 65% of the charge, precipitated and was recovered by filtration. The 5-cyano-2-oximinovaleric acid was separated as follows: A solution of 382.5 g. of nickelous sulfate hexahydrate in 583 ml. of water was added to the acid filtrate. A greenish-gray precipitate formed. After the mixture had stood for 18 hours, the solid was recovered by filtration, washed with a little water, and dried. This solid, the nickel complex of 5-cyano-2-oximinovaleric acid (dihydrate), amounted to 94.3 g., or 68% yield based on 2,6-dioximinocyclohexanone not recovered. The desired product was separated from the complex by dissolving 108.5 g. of the complex in a solution containing 21.5 g. of sodium hydroxide in 500 ml. of water. In another solution of 44.0 g. of sodium hydroxide in 1000 ml. of water was dissolved 63.9 g. of dimethyl glyoxime. With vigorous stirring the dimethyl glyoxime solution was added to the nickel complex solution. A heavy red precipitate of nickel dimethyl glyoxime formed, and was removed by filtration and washed with 100 ml. of water. The filtrate was then neutralized with concentrated hydrochloric acid, causing precipitation of additional nickel dimethyl glyoxime, which was removed by filtration. The filtrate was then concentrated by evaporation of water at 45–50° C. and 40–50 mm. pressure. The resulting solid, a mixture of sodium chloride and sodium 5-cyano-2-oximinovalerate, was slurried in 300 ml. of absolute ethanol, ground to a fine powder, filtered and dried. The crude salt was then suspended in 400 ml. of absolute ethanol, 36.8 ml. of concentrated hydrochloric acid was added, and the insoluble sodium chloride was removed by filtration. The filtrate was evaporated under reduced pressure at 40–45° C. to yield a solid which, on recrystallizing from chloroform, yielded 47.4 g. of solid, which melted at 101–104° C. A portion of this material was recrystallized by being taken up in hot ethyl acetate (5 ml./g. solid) and thrown out of solution by addition of two volumes of a 3:1 hexane-chloroform mixture. The recrystallized material melted at 109–110° C.

*Analysis.*—Calcd. for $C_6H_8O_3N_2$: C, 46.15; H, 5.16; N, 17.95; neut. equiv., 156.1. Found: C, 46.44; H, 4.92; N, 17.94; neut. equiv., 155.1.

*Example 3.—Preparation of 5-cyano-2-oximinovaleric acid*

Cleavage of 2,6-dioximinocyclohexanone was conducted using ethyl chloroformate as the acylating agent, as follows: To a solution of 100.0 g. of sodium hydroxide in one liter of water was added 78.1 g. of 2,6-dioximinocyclohexanone, the temperature being held at 20–25°. To the resulting solution was added dropwise 27.1 g. of ethyl chloroformate over 30 minutes, the temperature being held at 25–30° C. The reaction mixture was stirred for one hour. A solution of 75 ml. of concentrated sulfuric acid in 75 ml. of water was then added slowly, maintaining the temperature at 20–25° C. The unreacted 2,6-dioximinocyclohexanone which precipitated was recovered by filtration and dried; it amounted to 24.0 g. To the filtrate was added 15.0 g. of sodium sulfate, and the resulting saturated solution was extracted with six 75 ml. portions of ethyl acetate. The combined ethyl acetate extract was concentrated to a solid mass under reduced pressure at a temperature of 40–50° C. The solid was taken up in 50 ml. of hot ethyl acetate, and 200 ml. of hexane was added to precipitate the product, which was recovered by filtration and dried. It amounted to 13.0 g. of fairly pure 5-cyano-2-oximinovaleric acid, M.P. 105°. A 33% yield, based on ethyl chloroformate, was obtained.

*Example 4.—Preparation of 5-cyano-2-oximinovaleric acid*

Cleavage of 2,6-dioximinocyclohexanone was conducted using benzenesulfonyl chloride as acylating agent, as follows: To a solution of 40.0 g. of sodium hydroxide in 200 ml. of water was added 31.2 g. of 2,6-dioximinocyclohexanone, with stirring to dissolve the oxime. To this solution was added dropwise 26.5 g. of benzenesulfonyl chloride with vigorous stirring. The temperature was maintained between 18–31° C. by external cooling. When addition was complete the mixture was stirred at room temperature for an hour. Then 50 ml. of a solution of sulfuric acid in water in a 1:1 volume ratio was added slowly with vigorous stirring, the temperature being kept at 18–25° C. by external cooling. At the end of the addition the pH of the reaction mixture was approximately 1. A yellowish flaky solid precipitated during the acidification. This was recovered by suction filtration, and washed three times with 50 ml. portions of water. It was dried as much as possible on the filter, and further dried in vacuo. To the filtrate from this recovery was then added a solution of 52.6 g. of nickelous sulfate hexahydrate in 200 ml. of water. A grayish green precipitate, the nickel complex of 5-cyano-2-oximinovaleric acid, precipitated slowly. After 36 hours the precipitate was filtered, washed with water and dried in vacuo. The yield of this nickel complex, based on 2,6-dioximinocyclohexanone not recovered from the acidified original reaction mixture, was 35%. The desired 5-cyano-2-oximinovaleric acid was separated from this nickel complex following the procedure in Example 2.

*Example 5.—Preparation of 5-cyano-2-oximinovaleric acid*

Cleavage of 2,6-dioximinocyclohexanone was conducted using phosphorus oxychloride as acylating agent, as follows: This reaction was carried out as described in Example 4, using 7.7 g. of phosphorus oxychloride in place of the benzenesulfonyl chloride. There were recovered 13.9 g. of unreacted 2,6-dioximinocyclohexanone and 3.3 g. of the nickel complex of 5-cyano-2-oximinovaleric acid, identical to that described in Example 2. The yield was 11% based on phosphorus oxychloride, as 15% based on 2,6-dioximinocyclohexanone not recovered. Pure 5-cyano-2-oximinovaleric acid was separated from the nickel complex following the procedure of Example 2.

*Example 6.—Preparation of DL-lysine*

5-cyano-2-oximinovaleric acid was reduced, using an

Adams' catalyst, as follows: In a solution of 7.8 g. of 5-cyano-2-oximinovaleric acid in 100 ml. of glacial acetic acid was suspended 0.6 g. of platinum oxide (Adams') catalyst. The mixture was shaken with hydrogen at 50 p.s.i. and room temperature. In 8 hours the theoretical amount of hydrogen had been taken up. The catalyst was filtered from the reaction mixture, and the acetic acid was removed under reduced pressure, keeping the temperature below 50° C. The residue was treated with 25 ml. of concentrated hydrochloric acid, and the excess was evaporated under reduced pressure. This treatment was repeated, and after evaporation to dryness there remained 7.9 g. of solid. This was taken up in 100 ml. of boiling 95% ethanol, and a solution of 10 ml. of pyridine in 10 ml. of 95% ethanol was added. A white solid separated slowly. After several days standing this material was recovered by filtration and dried. It amounted to 3.3 g. (36%) of DL-lysine monohydrochloride, M.P. 258–262°. The infrared spectrum of this material was identical with that of an authentic sample of DL-lysine monohydrochloride.

*Example 7.—Preparation of DL-lysine*

5-cyano-2-oximinovaleric acid was reduced with sodium and alcohol as follows: In 500 ml. of carefully dried ethanol was dissolved 7.8 g. of 5-cyano-2-oximinovaleric acid, and the solution, protected from atmospheric moisture, was heated to gentle reflux. Then heat was removed and 36.8 g. of sodium was added as rapidly as possible consistent with avoiding too rapid reflux. When all the sodium had been added, the mixture was cooled to room temperature and made strongly acid with concentrated hydrochloric acid. The precipitate was filtered, and washed with alcohol. The combined alcohol solution was evaporated under reduced pressure, and the residue was taken up in 25 ml. of concentrated hydrochloric acid. This solution was evaporated under reduced pressure, and the residue was taken up in 200 ml. of hot 95% ethanol. The resulting soltuion was treated with a solution of 15 ml. of pyridine in 25 ml. of ethanol to precipitate DL-lysine monohydrochloride. The solid was recovered by filtration and dried. It amounted to 0.8 g. (9%) of DL-lysine monohydrochloride, M.P. 263–265°. The identity of the material was confirmed by infrared spectral examination.

*Example 8.—Preparation of ethyl 5-cyano-2-oximinovalerate*

To a solution of 31.0 g. of 5-cyano-2-oximinovaleric acid in 400 ml. of absolute ethanol was added 5.5 g. of thionyl chloride. The mixture as allowed to stand at room temperature until the acidity remained constant. This required nine days. Then the ethanol was removed by distillation at reduced pressure and a maximum temperature of 50° C. The solid residue was recrystallized twice from carbon tetrachloride to give 20.0 g. (61%) of pure ethyl 5-cyano-2-oximinovalerate, M.P. 74–75° C.

*Example 9.—Preparation of DL-lysine by reduction of ethyl 5-cyano-2-oximinovalerate*

The ester prepared in Example 8 was reduced, using a platinum oxide catalyst, as follows: In a solution of 36.8 g. of ethyl 5-cyano-2-oximinovalerate in 197 ml. of acetic anhydride was suspended 3.0 g. of platinum oxide, and the mixture was shaken with hydrogen at 50 p.s.i. and room temperature. In about 8 hours the theoretical amount of hydrogen was taken up. The catalyst was filtered from the reaction mixture and washed with 25 ml. of acetic anhydride. The anhydride solution was heated with 300 ml. of water to 50° C., and the solution was stirred until it became homogeneous. Then 450 ml. of concentrated hydrochloric acid was added, and the resulting mixture was heated under reflux for 16 hours. The water and hydrochloric acid were evaporated at reduced pressure at 50–60° C. The resulting syrup was treated twice with 100 ml. portions of concentrated hydrochloric acid, evaporating to a syrup after each treatment. The final syrup was dissolved in 200 ml. of boiling 95% ethanol. The solution was cooled to room temperature, and 800 ml. of ether was added. A white precipitate of DL-lysine dihydrochloride formed. This solid was dissolved in 850 ml. of hot absolute ethanol, and 48 ml. of pyridine in 100 ml. of hot ethanol was added. A white solid precipitated, and after standing for 16 hours at 5° C. the solid was recovered by filtration and dried. It amounted to 21.0 g. (57%) of DL-lysine monohydrochloride, M.P. 256–260°. Its infrared spectrum was identical to that of an authentic sample of DL-lysine monohydrochloride.

*Example 10.—Preparation of DL-lysine by reduction of ethyl 5-cyano-2-oximinovalerate*

Ethyl 5-cyano-2-oximinovalerate was reduced, using a Raney nickel catalyst, as follows: The reaction was run in a stainless steel bomb designed for moderate pressure. Into the bomb 9.2 g. of ethyl 5-cyano-2-oximinovalerate, 100 ml. of absolute ethanol and 10 g. of Raney nickel were charged. The solution was saturated with ammonia, and the bomb was pressurized with ammonia to 50 p.s.i. Then hydrogen was admitted to a total pressure of 250 p.s.i. Stirring and heat were applied. At about 100°, hydrogen uptake began with some evolution of heat. After several hours, the catalyst was filtered off and the filtrate was evaporated to dryness. The residue was taken up in 100 ml. of concentrated hydrochloric acid and refluxed overnight. The mixture was stripped to dryness, and the residue was taken up in 80 ml. of 95% ethanol, warmed and filtered. The filtrate was diluted with 400 ml. of ether to obtain a precipitate of lysine dihydrochloride. The ether was decanted, and the residue was dissolved in 150 ml. of warm 95% ethanol. This solution was treated with a solution of 15 ml. of pyridine in 25 ml. of ethanol. On cooling, a precipitate of crude lysine monohydrochloride formed. Recrystallization from water-ethanol gave 1.45 g. (15.9%) of pure lysine monohydrochloride, M.P. 265°, identified by its infrared spectrum.

*Example 11.—Preparation of 2,5-dioximino-cyclopentanone*

To a solution of 84.1 g. of cyclopentanone in 400 ml. of ether was added 12 ml. of concentrated hydrochloric acid. The solution was cooled to 5° C. and methyl nitrite was passed in from an external generator. The methyl nitrite was generated by adding a solution of 160 ml. of concentrated sulfuric acid in 290 ml. of water slowly to a mixture of 155.2 g. of sodium nitrite, 80.0 g. of methanol, and 100 ml. of water. The reaction mixture was held at 5–15° by external cooling as the methyl nitrite was passed in. A yellow solid precipitated as the reaction proceeded. When all the methyl nitrite had been added, the mixture was allowed to warm to 25°, held for three hours, and treated with 12 ml. of pyridine to neutralize the acid catalyst. The solid product was recovered by filtration, washed with two 50 ml. portions of ether, and dried in vacuo. It amounted to 67.0 g. (47%) of 2,5-dioximinocyclopentanone, M.P. 214° C.

*Analysis.*—Calcd. for $C_5H_6O_3N_2$: C, 42.25; H, 4.26; N, 19.72. Found: C, 42.41; H, 4.23; N, 19.97.

*Example 12.—Preparation of 4-cyano-2-oximinobutyric acid*

To a solution of 200.0 g. of sodium hydroxide in 2 liters of water was added 142.0 g. of 2,5-dioximinocyclopentanone, maintaining the temperature at 20–25° C. To the resulting solution was added dropwise over one half hour 51.1 g. of acetic anhydride, maintaining the temperature at 20–30° The reaction mixture was stirred for one hour, then a solution of 150 ml. of concentrated sulfuric acid in 150 ml. of water was added slowly, maintaining the temperature at 20–25°. Unreacted 2,5-dioximinocyclopentanone precipitated and was recovered by filtration. To the filtrate was added 450 g. of sodium sulfate, and the resulting saturated solution was extracted with six 400-ml. portions of ethyl acetate. The ethyl acetate solution was dried over anhydrous magnesium sulfate and concentrated to a solid mass under reduced pressure at 50–60°. The solid was taken up in 100 ml. of boiling ethyl acetate, and filtered to remove inorganic salts. To the filtrate was added 700 ml. of hexane, causing the separation of 4-cyano-2-oximinobutyric acid. The yield after filtration and drying was 25.6 g., or 36% based on acetic anhydride. After recrystallization by dissolving in ethyl acetate and precipitating with hexane, the product melted at 123–125° C.

*Analysis.*—Calcd. for $C_5H_6O_3N$: C, 42.25; H, 4.26; N, 19.72. Found: C, 42.24; H, 4.11; N, 19.84.

Example 13.—Preparation of DL-ornithine

In a solution of 7.1 g. of 4-cyano-2-oximinobutyric acid in 80 ml. of acetic acid was suspended 0.6 g. of platinum oxide (Adams' catalyst). The mixture was shaken at room temperature with hydrogen at 50 p.s.i. for 3.5 hours. The catalyst was filtered from the reaction mixture, and the acetic acid was evaporated under reduced pressure at 60–70° C. The syrupy residue was treated with 25 ml. of concentrated hydrochloric acid, and the excess was evaporated under reduced pressure. The treatment was repeated, and the syrupy residue was taken up in 200 ml. of hot 95% ethanol. The solution was filtered, and to the filtrate was added 800 ml. of ether. An oily precipitate of ornithine dihydrochloride separated. The solvent was removed by decantation, and the solid was taken up in 200 ml. of hot 95% ethanol. A hot solution of 10 ml. of pyridine in 20 ml. of absolute ethanol was added to the ethanol solution of crude dihydrochloride, and the separated solid was recovered by filtration and dried. It amounted to 3.6 g. of DL-ornithine monohydrochloride, M.P. 218–230° The infrared spectrum of this material was identical to that of an authentic sample of DL-ornithine monohydrochloride.

Example 14.—Preparation of 2,6-dioximino-4-methylcyclohexanone

A solution of 112.2 g. of 4-methylcyclohexanone in 400 ml. of ether containing 12 ml. of concentrated hydrochloric acid was treated with methyl nitrite as described in Example 11. The yellow solid obtained was washed with 150 ml. of water and 50 ml. of acetone, then dried in vacuo. It amounted to 122.0 g. (72%) of 2,6-dioximino-4-methylcyclohexanone.

*Analysis.*—Calcd. for $C_7H_{10}O_3N_2$: C, 49.40; H, 5.92; N, 16.47. Found: C, 49.72; H, 5.64; N, 16.22.

Example 15.—Preparation of 5-cyano-4-methyl-2-oximinovaleric acid

In a solution of 200.0 g. of sodium hydroxide in 2000 ml. of water was dissolved 170.2 g. of 2,6-dioximino-4-methylcyclohexanone, the temperature being held at 20–25° by external cooling. With vigorous stirring, 51.1 g. of acetic anhydride was added dropwise to this solution over 30 minutes, the temperature being maintained at 20–30° by external cooling. The resulting solution was stirred for an hour, and then a solution of 150 ml. of concentrated sulfuric acid in 150 ml. of water was added slowly, the temperature being held at 20–25° by external cooling. Unreacted 2,6-dioximino-4-methylcyclohexanone precipitated and was recovered by filtration. The filtrate was saturated with sodium sulfate and extracted with five 400 ml. portions of ethyl acetate. The combined ethyl acetate extracts were evaporated under reduced pressure to a solid mass. The solid was treated with 200 ml. of hot chloroform, and the material which failed to dissolve (inorganic salts) was removed by filtration. On cooling the chloroform solution, white crystals precipitated, which after filtration and drying in vacuo gave 9.5 g. of white solid, M.P. 109–111°. To the filtrate from the crystallization was added four volumes of n-hexane, which caused more solid to crystallize, for a combined yield of 5-cyano-4-methyl-2-oximinovaleric acid of 23.0 g. (26% based on acetic anhydride).

*Analysis.*—Calcd. for $C_7H_{10}O_3N_2$: C, 49.40; H, 5.92; N, 16.47. Found: C, 49.30; H, 5.72; N, 16.56.

Example 16.—Preparation 2,6-diamino-4-methylcaproic acid

In a solution of 8.5 g. of 5-cyano-4-methyl-2-oximinovaleric acid in 100 ml. of acetic acid was suspended 0.6 g. of platinum oxid (Adams' catalyst). The solution was shaken at room temperature with hydrogen at 50 p.s.i. for 4 hours. The catalyst was removed by filtration, and the acetic acid was evaporated under reduced pressure. To the resulting syrup was added 25 ml. of concentrated hydrochloric acid and the solution was again concentrated to a syrup. The acid treatment and concentration were repeated, and the resulting syrup was taken up in 200 ml. of boiling 95% ethanol. The solution was filtered, cooled, and 800 ml. of ether was added. An oil settled out. The solvent mixture was decanted, and the oil was taken up in 200 ml. of boiling 97% ethanol. To the hot solution was added a solution of 10 ml. of pyridine in 20 ml. of 100% ethanol. On cooling and standing in the cold a solid product separated. It was recovered by filtration and dried in vacuo to give 0.75 g. of fairly pure 2,6-diamino-4-methylcaproic acid hydrochloride, M.P. 212–220°. Recrystallization from hot ethanol gave pure 2,6-diamino-4-methylcaproic acid hydrochloride, M.P. 228–230°. This compound is a useful antimetabolite in chemotherapy.

*Analysis.*—Calcd. for $C_7H_{17}O_2N_2Cl$: C, 42.74; H, 8.71; N, 14.24; Cl, 18.10. Found: C, 42.71; H, 8.71; N, 14.46; Cl, 18.10.

From the foregoing description and illustrative examples it is apparent that the novel process of this invention is susceptible to numerous modifications and variations within the scope of the disclosure, and it is intended to include such modifications and variations in the following claims.

We claim:
1. The method of producing an alpha,omega-diamino carboxylic acid from a cyclic ketone having a five to seven carbon ring, comprising the steps of nitrosating the cyclic ketone on the alpha carbon atoms to form an $\alpha,\alpha'$-dioximino cyclic ketone, reacting said $\alpha,\alpha'$-dioximino cyclic ketone with an acylating agent in aqueous base, thereby cleaving the ring structure between the carbonyl carbon and one of the alpha carbons to form an omega-cyano alpha-oximino carboxylic acid, and reducing said omega-cyano and alpha-oximino groups to amino, to produce an alpha,omega-diamino carboxylic acid.
2. The method of claim 1, wherein said acylating agent is a lower aliphatic anhydride.
3. The method of claim 2, wherein said acylating agent is acetic anhydride.
4. The method of claim 1, wherein said base is an alkali metal hydroxide.
5. The method of claim 4, wherein said base is sodium hydroxide.
6. The method of producing an alpha,omega-diamino carboxylic acid from a cyclic ketone having a five to seven carbon ring, comprising the steps of nitrosating the cyclic ketone on the alpha carbon atoms to form an $\alpha,\alpha'$-dioximino cyclic ketone, reacting said $\alpha,\alpha'$-dioximino cyclic ketone with an acylating agent in aqueous base, thereby cleaving the ring structure between the carbonyl carbon and one of the alpha carbons to form an omega-cyano alpha-oximino carboxylic acid, esterifying said omega-cyano alpha-oximino carboxylic acid to produce an omega-cyno alpha-oximino carboxylic ester, reducing said omega-cyano alpha-oximino carboxylic ester to an alpha,omega-diamino carboxylic ester, and hydrolyzing said ester to an alpha,omega-diamino carboxylic acid.

7. The method of producing 2,6-diaminocaproic acid from cyclohexanone, comprising the steps of nitrosating cyclohexanone on the alpha carbon atoms to form 2,6-dioximinocyclohexanone, reacting the 2,6-dioximinocyclohexanone with an acylating agent in aqueous base, thereby cleaving the ring structure between the carbonyl carbon and one of the alpha carbons to form 5-cyano-2-oximinovaleric acid, and reducing the cyano and oximino groups to amino, to produce 2,6-diaminocaproic acid.

8. The method of producing 2,5-diaminovaleric acid from cyclopentanone, comprising the steps of nitrosating cyclopentanone on the alpha carbon atoms to form 2,5-dioximinocyclopentanone, reacting the 2,5-dioximinocyclopentanone with an acylating agent in aqueous base, thereby cleaving the ring structure between the carbonyl carbon and one of the alpha carbons to form 4-cyano-2-oximinobutyric acid, and reducing the cyano and oximino groups to amino, to produce 2,5-diaminovaleric acid.

9. The method of producing glutamine from cyclopentanone, comprising the steps of nitrosating cyclopentanone on the alpha carbon atoms to form 2-5-dioximinocyclopentanone, reacting the 2,5-dioximinocyclopentanone with an acylating agent in aqueous base, thereby cleaving the ring structure between the carbonyl carbon and one of the alpha carbons to form 4-cyano-2-oximinobutyric acid, hydrolyzing the 4-cyano group to 4-carbamido and reducing the 2-oximino group to 2-amino, thereby producing glutamine.

10. The method of producing arginine from cyclopentanone, comprising the steps of nitrosating cyclopentanone on the alpha carbon atoms to form 2,5-dioximinocyclopentanone, reacting the 2,5-dioximinocyclopentanone with an acylating agent in aqueous base, thereby cleaving the 2,5-dioximinocyclopentanone between the carbonyl carbon and one of the alpha carbons to form 4-cyano-2-oximinobutyric acid, reducing the cyano and oximino groups to amino, to produce 2,5-diaminovaleric acid, and reacting the 2,5-diaminovaleric acid with cyanamide to form arginine.

11. The method of producing an alpha,omega-diamino carboxylic acid from a cyclic ketone having a five to seven carbon ring, said cyclic ketone having a group selected from the class consisting of oximino, amido, nitro, halogen, amino and amino derivtives in one of the positions alpha to the ketone group, comprising the steps of nitrosating said cyclic ketone in the other alpha position to the keto group, reacting said alpha-oximino cyclic ketone with an acylating agent in aqueous base, thereby cleaving the ring structure between the carbonyl carbon and the alpha-oximino carbon to form an omega-cyano carboxylic acid having a potential amino group alpha to the carboxyl group, reducing the omega cyano group to amino and converting the potential amino group to amino, thereby producing an alpha,omega-diamino carboxylic acid.

12. The method of producing an omega-cyano carboxylic acid by cleaving a cyclic ketone having a 5 to 7 carbon ring with a group selected from the class consisting of oximino, amido, nitro, halogen, amino and amino derivatives on one position alpha to the carbonyl group and an oximino group on the other position alpha to the carbonyl group, comprising the step of reacting said cyclic ketone with an acylating agent in aqueous base, thereby cleaving the ring structure between the carbonyl carbon and the alpha-oximino carbon, to produce said omega-cyano carboxylic acid.

13. The method of producing an omega-cyano alpha-oximino carboxylic acid by cleaving an $\alpha,\alpha'$-dioximino cyclic ketone having a 5 to 7 carbon ring, comprising the step of reacting said $\alpha,\alpha'$-dioximino cyclic ketone with an acylating agent in aqueous base, thereby cleaving said ring structure between the carbonyl carbon and one of the alpha carbons, to produce said omega-cyano-alpha-oximino carboxylic acid.

14. The method of producing an omega-cyano-alpha-oximino carboxylic acid by cleaving an $\alpha,\alpha'$-dioximino cyclic ketone having a 5 to 7 carbon ring, comprising the step of reacting said cyclic ketone with an acylating agent in aqueous base, wherein a maximum of about 1 mole of acylating agent is reacted per mole of cyclic ketone, thereby cleaving the ring structure to form the omega-cyano alpha-oximino carboxylic acid.

15. The method of producing an omega-cyano-alpha-oximino carboxylic acid by cleaving an $\alpha,\alpha'$-dioximino cyclic ketone having a 5 to 7 carbon ring, comprising the step of reacting said cyclic ketone with an acylating agent in aqueous base, wherein about 0.7–0.75 mole of acylating agent is reacted per mole of cyclic ketone, thereby cleaving the ring structure to form said omega-cyano-alpha-oximinocarboxylic acid.

References Cited in the file of this patent

UNITED STATES PATENTS

| | | |
|---|---|---|
| 2,564,649 | Rogers | Aug. 14, 1951 |
| 2,738,363 | Godefroi | Mar. 13, 1956 |

OTHER REFERENCES

Block: Chemical Reviews, volume 38, No. 3, June 1946, pages 501 and 516.

Olynyk et al.: "Journal Org. Chemistry," volume 13, 465 (1948).

Rodd: "Chemistry of Carbon Compounds," volume I, part A, 1951, pages 726 and 383.

Touster: "Organic Reactions," volume 7, chapter 6, pages 327 and 360, 1953.

UNITED STATES PATENT OFFICE
CERTIFICATE OF CORRECTION

Patent No. 2,999,875 September 12, 1961

Arthur F. Ferris et al.

It is hereby certified that error appears in the above numbered patent requiring correction and that the said Letters Patent should read as corrected below.

Column 5, line 46, for "hydorylsis" read -- hydrolysis --; line 59, for "prithine" read -- ornithine --; column 6, line 13, after "sodium" insert -- or --; column 7, line 23, for "147.8" read -- 148.8 --; column 9, line 51, for "as" read -- was --; column 12, line 15, for "oxid" read -- oxide --; column 13, line 2, for "omega-cyno" read -- omega-cyano --; line 50, for derivtives" read -- derivatives --; same column 13, line 51, for "ketone" read -- keto --.

Signed and sealed this 20th day of February 1962.

(SEAL)
Attest:

ERNEST W. SWIDER

Attesting Officer

DAVID L. LADD

Commissioner of Patent